United States Patent
Paatero et al.

(10) Patent No.: US 8,301,911 B2
(45) Date of Patent: Oct. 30, 2012

(54) KEY STORAGE ADMINISTRATION

(75) Inventors: Lauri Paatero, Helsinki (FI); Piotr Cofta, Dublin (IE)

(73) Assignee: Nokia Corporation, Espoo (FI)

(*) Notice: Subject to any disclaimer, the term of this patent is extended or adjusted under 35 U.S.C. 154(b) by 1094 days.

(21) Appl. No.: 10/887,474

(22) Filed: Jul. 6, 2004

(65) Prior Publication Data

US 2005/0044375 A1 Feb. 24, 2005

(30) Foreign Application Priority Data

Jul. 4, 2003 (WO) .................. PCT/IB03/02661

(51) Int. Cl.
*G06F 12/14* (2006.01)
(52) U.S. Cl. ........................... 713/193; 726/26
(58) Field of Classification Search ................ 726/9, 17, 726/19, 20, 26–28; 713/173, 193, 194, 185
See application file for complete search history.

(56) References Cited

U.S. PATENT DOCUMENTS

| | | | | |
|---|---|---|---|---|
| 5,978,484 A * | 11/1999 | Apperson et al. | ............... | 705/54 |
| 6,038,551 A * | 3/2000 | Barlow et al. | .................... | 705/41 |
| 6,178,508 B1 | 1/2001 | Kaufman | | |
| 6,292,874 B1 * | 9/2001 | Barnett | .......................... | 711/153 |
| 6,694,436 B1 * | 2/2004 | Audebert | .......................... | 726/9 |
| 7,243,853 B1 * | 7/2007 | Levy et al. | .................... | 235/492 |
| 2001/0051928 A1 * | 12/2001 | Brody | ............................. | 705/52 |
| 2002/0064074 A1 * | 5/2002 | Kamise et al. | ................ | 365/200 |
| 2003/0061504 A1 * | 3/2003 | Sprigg et al. | .................. | 713/200 |
| 2003/0065947 A1 * | 4/2003 | Song et al. | .................... | 713/201 |
| 2005/0010796 A1 * | 1/2005 | Arnouse | ........................ | 713/200 |

FOREIGN PATENT DOCUMENTS

| | | |
|---|---|---|
| EP | 0 828 208 | 3/1998 |
| WO | WO 02/075677 A1 | 9/2002 |
| WO | WO-2004/015553 A1 | 2/2004 |

OTHER PUBLICATIONS

European Patent Office; "European Examination Report"; whole document; Jul. 21, 2010.
A.J. Menezes et al.; "Chapter 1: Overview of Cryptography"; Handbook of Applied Cryptography; CRC Press Series on Discrete Mathematics and Its Applications; Oct. 1, 1996; pp. 1-48; CRC Press; Boca Raton, FL, USA.
A.J. Menezes et al.; "Chapter 11: Digital Signatures"; Handbook of Applied Cryptography; CRC Press Series on Discrete Mathematics and Its Applications; Oct. 1, 1996; pp. 425-488; CRC Press; Boca Raton, FL, USA.
"Mobile Information Device Profile for Java™ 2 icro Edition, Version 2.0", JSR 118 Expert Group, jsr-118-comments@jcp.or, Java Community Process, Nov. 2002, 560 pgs.

* cited by examiner

*Primary Examiner* — Edward Zee
(74) *Attorney, Agent, or Firm* — Harrington & Smith

(57) ABSTRACT

The present invention relates to a method and a system for allowing multiple applications to manage their respective data in a device (100, 200) having a secure environment (104, 204, 211) to which access is strictly controlled. The idea of the invention is that a storage area is allocated (301) within the secure environment (104, 204, 211) of a device (100, 200). The storage area is associated (302) with an identity of an application, the associated identity is stored (303) in the secure environment (104, 204, 211) and access to the storage area is controlled (304) by verifying correspondence between the associated identity and the identity of an accessing application. This is advantageous, since it is possible for the accessing application to read, write and modify objects, such as cryptographic keys, intermediate cryptographic calculation results and passwords, in the allocated storage area.

12 Claims, 3 Drawing Sheets

US 8,301,911 B2

KEY STORAGE ADMINISTRATION

CROSS-REFERENCE TO RELATED APPLICATIONS

This application claims priority under 35 USC §119 to International Patent Application No. PCT/IB03/02661 filed on Jul. 4, 2003.

TECHNICAL FIELD OF THE INVENTION

The present invention relates to a method and a system for allowing multiple applications to manage their respective data in a device having a secure environment to which access is strictly controlled.

BACKGROUND ART

Various electronic devices, such as mobile telecommunication terminals, portable computers and PDAs require access to security related components such as application programs, cryptographic keys, cryptographic key data material, intermediate cryptographic calculation results, passwords, authentication means for externally downloaded data etc. It is often necessary that these components, and the processing of them, is kept secret within the electronic device. Ideally, they shall be known by as few people as possible. This is due to the fact that a device, for example a mobile terminal, could possibly be tampered with if these components are known. Access to these types of components might aid an attacker with the malicious intent to manipulate a terminal.

Therefore, a secure execution environment is introduced in which environment a processor within the electronic device is able to access the security related components. Access to the secure execution environment, processing in it and exit from it should be carefully controlled. Prior art hardware comprising this secure environment is often enclosed within a tamper resistant packaging. It should not be possible to probe or perform measurements and tests on this type of hardware which could result in the revealing of security related components and the processing of them.

The "Mobile Information Device Profile" for Java™ 2 Micro Edition, Version 2.0, by the JSR 118 Expert Group defines an enhanced architecture and associated application program interfaces (APIs) required to enable an open, third-party, application development environment for mobile information devices (MIDs). Examples of MIDs include cellular phones, two-way pagers, and wireless-enabled PDAs. If a device determines that an MID application can be trusted, then access is allowed as indicated by security policy of the device. Signed applications may become trusted by authenticating the signer of the applications.

The Mobile Information Device Profile provides a mechanism for applications to persistently store data and retrieve it later in so called record stores. A record store consists of a collection of records that will remain persistent across multiple invocations of an application. The mobile information device platform is responsible for making its best effort to maintain the integrity of the record stores of the applications throughout the normal use of the platform, including reboots, battery changes, etc. Record stores are created in platform-dependent locations, which are not exposed to applications.

In the prior art, when performing security related operations in a device accessed by many different parties, the parties accessing the device by means of different application programs, the many different non-coordinated, mutually independent parties each want to manage their own cryptographic data such as cryptographic keys, cryptographic key data material, intermediate cryptographic calculation results and passwords in the device, and this results in a number of different problems. For example, the secure execution environment normally has its designated owner. The secure execution environment can e.g. be provided in the form of a smart card, typically arranged in a mobile telephone. The designated owner of the smart card is the card issuer, and it is the card issuer that decides which application programs are accepted and handled by the card, for example what software that initially is loaded into the card and what types of commands the card complies with. This leads to the problem that the card issuer is given a dominant role as sole card administrator and can prohibit other parties from re-using the smart card for their own purposes. Generally, creation of an object on a smart card, by an application of a party which is not the administrator of the smart card in question, requires the permission of the administrator. This is problematic, since it normally entails on-line connection to a server of the administrating party, i.e. the card issuer. Further, even if the object is established on a card, access control of the object is basically non-existent; either the object is globally available to all applications that can access the card, or it is only available to the applications of the card administrator.

SUMMARY OF THE INVENTION

It is an object of the present invention to provide a solution to the above given problems by proposing a system and a method, in which it is possible for different parties to store and access their own respective data in the secure environment independent of each other and without the supervision of a secure environment administrator. This object is achieved by a method for allowing multiple applications to manage their respective data in a device (100, 200) having a secure environment (104, 204, 211) to which access is strictly controlled, the method comprising the steps of: allocating (301) a storage area within the secure environment (104, 204, 211); associating (302) the storage area with an identity of an application; storing (303) the associated identity within the secure environment; and controlling (304) access to the storage area by verifying correspondence between the associated identity and the identity of an accessing application.

This object is also achieved by a system for allowing multiple applications to manage their respective data in a device (100, 200) having a secure environment (104, 204, 211) to which access is strictly controlled, the system comprising: means (103, 203) for allocating (301) a storage area within the secure environment (104, 204, 211); means (103, 203) for associating (302) the storage area with an identity of an application; means (103, 203) for storing (303) the associated identity within the secure environment (104, 204, 211); and means (103, 203) for controlling (304) access to the storage area by verifying correspondence between the associated identity and the identity of an accessing application.

This object is further achieved by circuitry (101, 201) for providing data security, which circuitry (101, 201) contains at least one processor (103, 203) and at least one storage circuit (104, 204, 211) and which circuitry (101, 201) comprises: at least one storage area in said storage circuit (104, 204, 211), in which storage area protected data relating to circuitry security are located; mode setting means arranged to set said processor (103, 203) in one of at least two different operating modes, the mode setting means being capable of altering the processor (103, 203) operating mode; storage circuit access control means arranged to enable said processor (103, 203) to access said storage area in which said protected data are located when a first processor operating mode is set; and storage circuit access control means arranged to prevent said processor (103, 203) from accessing said storage area in which protected data are located when a second processor operating mode is set.

The object is still further achieved by a computer program comprising computer-executable components for causing a device (100, 200) to perform the steps recited in the above-recited method when the computer-executable components are run on a processing unit (103, 203) included in the device.

The object is also achieved by a computer-readable medium storing computer-executable components for causing a device (100, 200) to perform the steps recited in the above-recited method when the computer-executable components are run on a processing unit (103, 203) included in the device.

According to a first aspect of the invention, a method is provided in which a storage area is allocated within the secure environment. The storage area is associated with an identity of an application. Further, the associated identity is stored within the secure environment and access to the storage area is controlled by verifying correspondence between the associated identity and the identity of an accessing application.

According to a second aspect of the invention, a system is provided wherein means is arranged to allocate a storage area within the secure environment and to associate the storage area with an identity of an application. Further, means is arranged to store the associated identity within the secure environment and control access to the storage area by verifying correspondence between the associated identity and the identity of an accessing application.

According to a third aspect of the invention, circuitry is provided in which at least one storage area is located. The storage area contains protected data relating to circuitry security. Mode setting means are arranged to set the processor in one of at least two different operating modes. The mode setting means is capable of altering the processor operating mode. Storage circuit access control means are arranged to enable the processor to access the storage area in which the protected data are located, when a first processor operating mode is set. Further, storage circuit access control means are arranged to prevent said processor from accessing said storage area in which protected data are located, when a second processor operating mode is set.

The idea of the invention is that a storage area is allocated within the secure environment of a device. The device can, for example, comprise a mobile telecommunication terminal, a portable computer, a PDA etc. In the device, the storage area is associated with an identity of an application. Applications, or application programs, are considered to be programs designed to perform a specific function in the device, and can also interact with other applications to perform a specific function in the device. The applications can be provided by a number of different parties, for example operators, device manufacturers, third party application developers, service providers etc. Applications can be programs residing in the device from the time of manufacturing and/or programs downloaded to the device during operation. The associated identity is stored in the secure environment and access to the storage area is controlled by verifying correspondence between the associated identity and the identity of an accessing application.

The present invention is advantageous, since it is possible for the accessing application to read, write and modify objects, such as cryptographic keys, cryptographic key data material, intermediate cryptographic calculation results and passwords, in the allocated storage area, given that the associated identity stored in the secure environment corresponds to the identity of the accessing application. On subsequent accesses of the storage area, the application will be required to identify itself. The data in the storage area is accessible, and modifiable, by any application having an identity corresponding to the identity associated with the storage area. Thus, any application having an identity corresponding to the associated identity is able to administrate the storage area, for example reading, writing and modifying the storage area, restricting the access to it, associating the storage area with a new identity etc. The administrator of the allocated storage area is thereby the administrator of a subset of the total secure environment storage area, having the capability to deallocate the storage area if necessary.

Further, the present invention is advantageous, since not only is it possible for different applications to access the secure environment of a device, different parties can thus access the allocated storage area as well, without having to interact with the administrator of the secure execution environment. In case the secure execution environment comes in the form of a smart card removably arranged in a device such as a mobile phone, the administrator is normally the issuer of the card. In the case where the environment consist of, for example, an integrated circuit being permanently arranged in the device, the administrator normally is the manufacturer of the device. The card issuer (and/or the device manufacturer), i.e. the "master" administrator, is still able to control the card by means of the specific software located on the card/in the device, since certain application programs residing in the secure environment has precedence over other application programs. In a mobile telecommunication terminal, a boot software should exist, which software includes the main functionality of the terminal. It is not possible to boot the terminal to normal operating mode without this software. By controlling this boot software, it is thus also possible to take precedence over other applications. Therefore, the master administrator can e.g. prevent applications from requesting too much storage or disable the storage area allocation entirely, if desired.

According to an embodiment of the invention, the identity of an application is a digital signature created by means of, for example, taking the hash value of the application code and encrypting the hash value with a private key. The party responsible for an application can then provide a digital signature and distribute the corresponding public key together with the signed application. The verification of the identity is then performed by decrypting the hash value of the application with the public key that corresponds to said private key. This is a smooth and straightforward method to provide the identity. It is only possible for a party with access to the private key to identify itself correctly. Encrypting the hash value has an advantage over encrypting the entire application code with an asymmetric key in that less computation is required.

According to another embodiment of the invention, a first storage area is allocated for a first party application, the storage area is associated with a first party application identity, the associated first identity is stored in the secure environment and the control of the access to the storage area is performed by verifying correspondence between the first party application identity and the identity of an accessing application. Subsequently, a second storage area is allocated for a second party application, the storage area is associated with a second party application identity, the associated second identity is stored in the secure environment and the control of the access to the storage area is performed by verifying correspondence between the second party application identity and the identity of an accessing application. The first party and the second party are independent of each other and thus, different parties can allocate a storage area in the secure environment without having to contact the secure environment administrator. It is possible that a second party application can seize the allocated storage area of the first party application, given that the device authorizes the second party application to do so. For example, the storage area to be seized might once have been allocated by a service provider which offers a service that a user of the device no longer requires.

According to yet another embodiment of the invention, the application is located outside the device and sends commands to the device instructing the device to perform the steps of allocating a storage area within the secure environment and associating the storage area with an identity of an application, the application identity being attached to the commands. This has the advantage that a party can send a command to the device, and the device will allocate a storage area and associate it with the identity of the application and, thus, the application does not have to be loaded into the device for the allocation to be undertaken, but the allocation can be performed with the application being remotely located in relation to the device.

According to a further embodiment of the invention, the device stores a digital certificate issued by a certification authority (CA). Certificates are used in a public key infrastructure to ensure actors contained in the infrastructure that the holder of a certificate has been authorized by a trusted certification authority. The CA verifies the information provided by the requester of a digital certificate and, in case of a successful verification, the CA can issue a certificate to the requester. The certificate is signed by the CA and contains e.g. the certificate holders public key, the holders name and other information about the certificate owner.

Further features of, and advantages with, the present invention will become apparent when studying the appended claims and the following description. Those skilled in the art realize that different features of the present invention can be combined to create embodiments other than those described in the following. It is also possible to make combinations of described embodiments to create new embodiments. Many different alterations, modifications and combinations will become apparent for those skilled in the art.

BRIEF DESCRIPTION OF THE DRAWINGS

The present invention will be described in greater detail with reference to the following drawings, in which.

DESCRIPTION OF PREFERRED
EMBODIMENTS OF THE INVENTION

Figure 1:
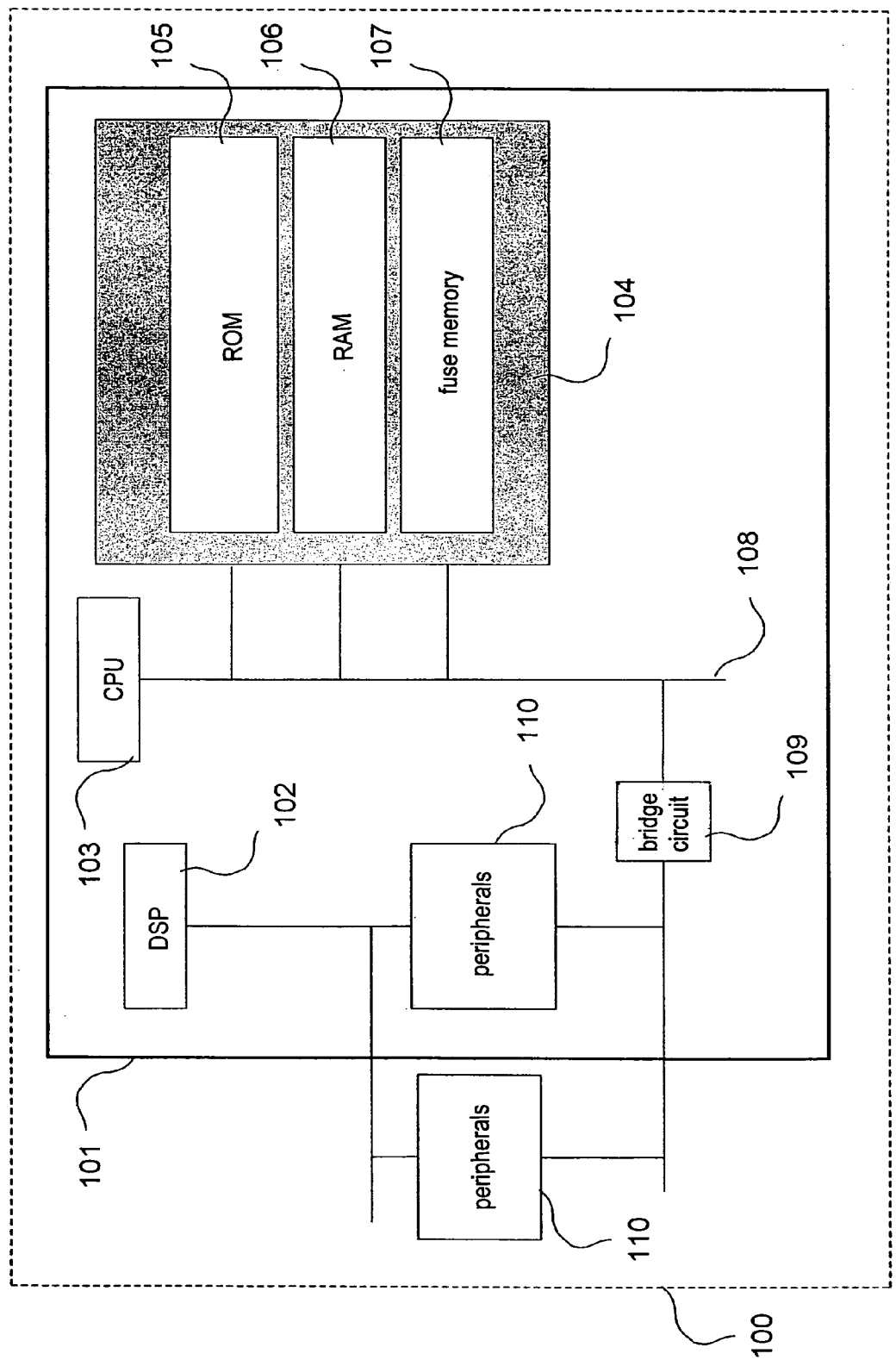
FIG. 1 shows a block scheme of a device architecture for providing data security in which architecture the present invention advantageously can be applied.

A device architecture for providing data security is shown in FIG. 1. Such a system is further disclosed in the Applicant's international patent application PCT/IB02/03216, which application is incorporated herein by reference. The device is implemented in the form of an ASIC (Application Specific Integrated Circuit) 101. The processing part of the architecture contains a CPU 103 and a digital signal processor (DSP) 102. The ASIC 101, is included in an electronic appliance 100 such as a mobile telecommunication terminal, a portable computer, a PDA etc. and is considered to be the "brain" of the appliance 100.

The secure environment 104 comprises a ROM 105 from which the ASIC 101 is booted. This ROM 105 contains boot application software and an operating system. Certain application programs residing in the secure environment 104 has precedence over other application programs. In a mobile telecommunication terminal, in which the ASIC 101 can be arranged, a boot software should exist, which software includes the main functionality of the terminal. It is not possible to boot the terminal to normal operating mode without this software. This has the advantage that by controlling this boot software, it is also possible to control the initial activation of each terminal.

The secure environment 104 also comprises RAM 106 for storage of data and applications, i.e. protected data. The RAM 106 preferably stores so called protected applications, which are smaller size applications for performing security critical operations inside the secure environment 104, but also objects such as cryptographic keys, intermediate cryptographic calculation results and passwords. Normally, the way to employ protected applications is to let "normal" applications request services from a certain protected application. New protected applications can be downloaded into the secure environment 104 at any time, which would not be the case if they would reside in ROM. Secure environment 104 software controls the download and execution of protected applications. Only signed protected applications are allowed to run. The protected applications can access any resources in the secure environment 104 and they can also communicate with normal applications for the provision of security services.

In the secure environment 104, a fuse memory 107 is comprised containing a unique random number that is generated and programmed into the ASIC 101 during manufacturing. This random number is used as the identity of a specific ASIC 101 and is further employed to derive keys for cryptographic operations. Further, storage circuit access control means in the form of a security control register is arranged in the secure environment 104. The purpose of the security control register is to give the CPU 103 access to the secure environment 104, or preventing the CPU 103 from accessing the secure environment 104, depending on the mode set in the register. Operating modes for the CPU 103 can be set in the register by application software, resulting in the fact that the architecture does not have to rely on external signals. From a security viewpoint, this is preferable since by controlling the application software, the setting of processor modes can also be controlled. It is also possible to have an external signal (not shown) connected to the ASIC 101, by which signal it is possible to set the security control register. By using an external signal, a mode change can be executed easy and fast, which can be advantageous in test environments. A combination of these two mode setting means, i.e. application software as well as external signals, is feasible.

The architecture further comprises a standard bridge circuit 109 for limitation of data visibility on the bus 108. The architecture should be enclosed within a tamper resistant packaging. It should not be possible to probe or perform measurements and tests on this type of hardware which could result in the revealing of security related components and the processing of them. The DSP 102 has access to other peripherals 110 such as a direct memory access (DMA) unit, RAMs, flash memories and additional processors can be provided outside the ASIC 101.

Figure 2:
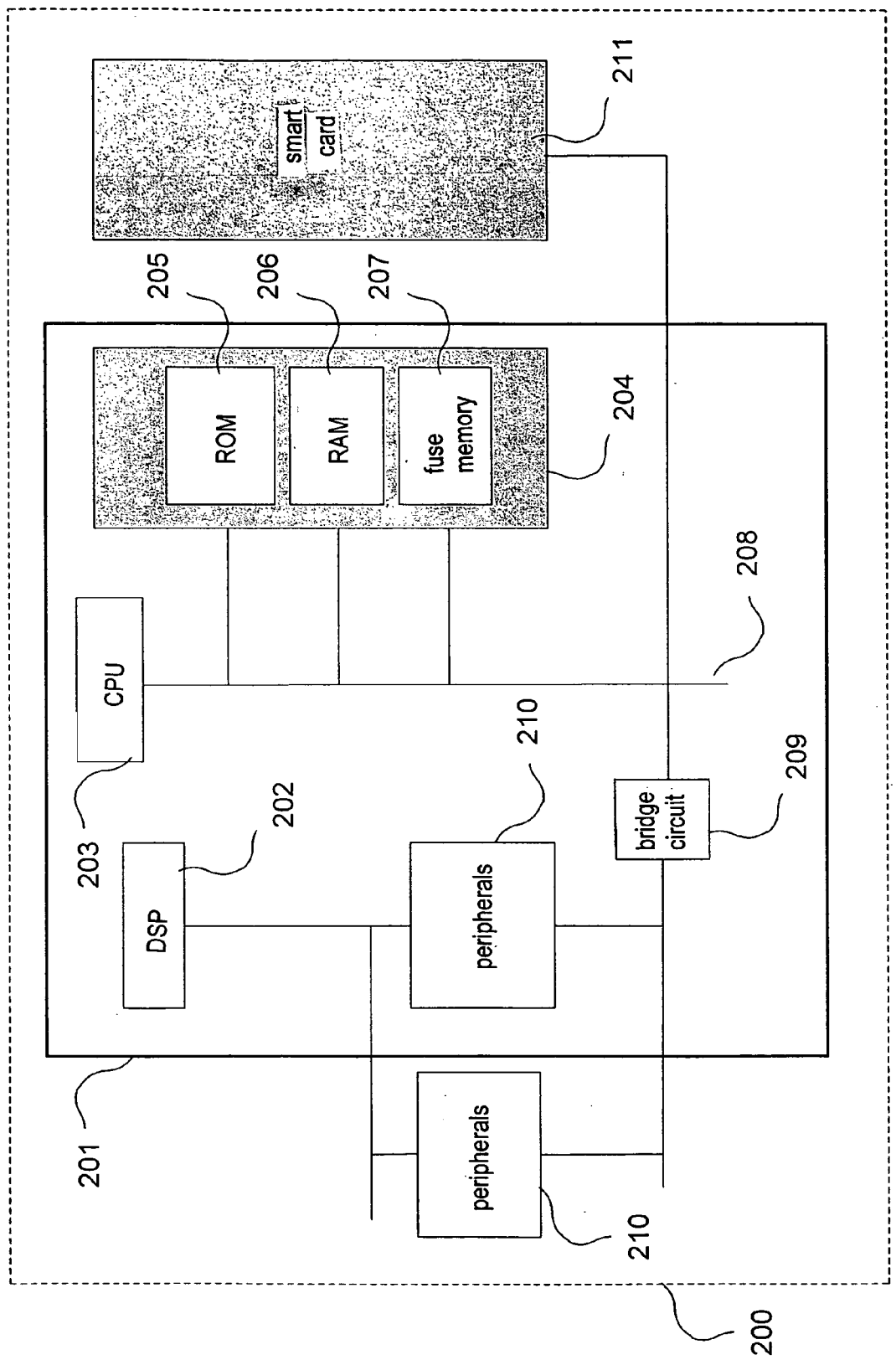
FIG. 2 shows a block scheme of the device architecture for providing data security, further arranged with a removable smart card, in which architecture the present invention advantageously can be applied.

Another embodiment of the device architecture for providing data security is shown in FIG. 2, wherein corresponding reference numerals denote corresponding elements as described in connection to FIG. 1. The difference in the architecture shown in FIG. 2, as compared to the architecture illustrated in FIG. 1, is that the electronic appliance 200 is arranged with a removable smart card 211, for example a subscriber identity module (SIM) card, which is also considered a secure environment.

For security purposes, the mobile terminal 200 as well as the smart card 211 stores a digital certificate issued by a trusted CA. Certificates are used to ensure actors communicating with the mobile terminal 200 and/or the smart card 211 that the holder of the certificate has been authorized by the trusted CA. The CA signs the certificate, and the certificate holder must be in possession of the public key that corresponds to the private key of the CA to verify that a certificate signed by the CA is valid. Note that different devices can hold certificates from different CAs. In that case, the different CAs must perform some communication with one another, for example exchange their own public keys. Certificates are well known for those skilled in the art, and a well known standard certificate are the certificate contained in the CCITT recommendation X.509.

Figure 3:
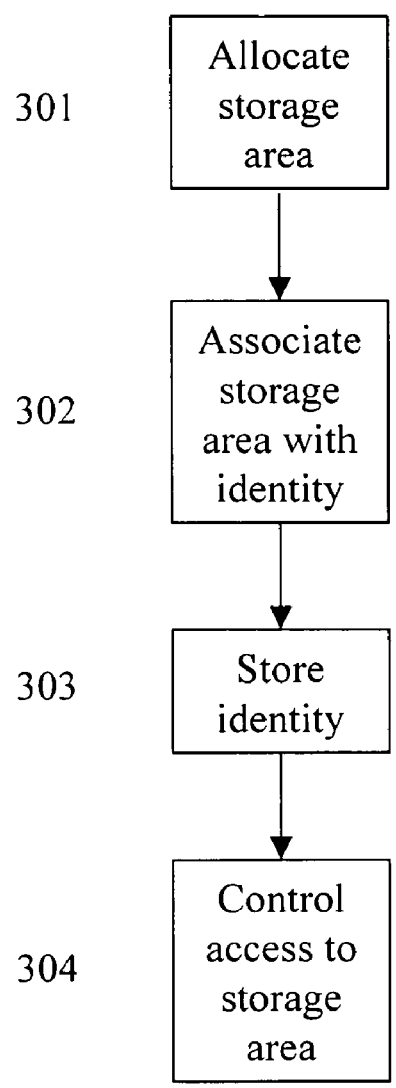
FIG. 3 shows a flow chart for allocating a storage area in a secure environment, in accordance with the present invention.

FIG. 3 shows a flow chart illustrating how a storage area is allocated in the smart card shown in FIG. 2. Note that it is also possible to allocate a storage area in the secure environment of the ASIC 101, 201 described in FIGS. 1 and 2. The procedure to allocate a storage area is the same whether the secure environment of the ASIC 101, 201 or the secure environment provided by the smart card 211 is used. In step 301, the mobile terminal 200 receives a request to allocate a storage area in the smart card 211. The request can made by an application loaded into the terminal, but it can also be made by an application located outside the mobile terminal. Next, in step 302, the certificate of the application is checked by the CPU 203 of the ASIC 201 to ensure that the application is trusted. The identity (which will be described in the following) of the application is associated to the allocated storage area and stored in the smart card 211. The association can be very straightforward, e.g. the identity is associated to a storage area allocated between two certain addresses in the smart card. Further, in step 303, the associated identity is stored in the smart card 211.

In step 304, an application makes a request to access an allocated storage area in the smart card 211; the CPU 203 of the ASIC 201 checks the identity of the requesting application. The identity of the requesting application is preferably a digital signature created by means of taking the hash value of the application code and encrypting the hash value with a private key. The party responsible for an application, e.g. an operator, a third party application developer or a service provider, can then provide a digital signature and distribute the corresponding public key together with the signed application. The verification of the identity is then performed by the CPU 203 by means of, in the secure environment of the ASIC 201, decrypting the hash value of the application with the public key that corresponds to the application private key. The access to the allocated storage area in the smart card 211 is controlled by the CPU 203 by means of verifying correspondence between the associated identity stored in the card 211 and the identity of the accessing application.

A number of methods used to identify the application exist and are known by those skilled in the art. It is possible to use hash functions on the application code and sign the hash code and/or use certificates, as described above. It is also possible to rely on certificates only, but additional cryptographic operations is feasible to attain a higher level of security. Other potential methods include signing the application itself, using platform generated identification numbers etc.

When a storage area has been allocated in the smart card 211 or, alternatively, in the secure environment 204 of the ASIC 201, an authorized accessing application can read, write and modify objects, such as cryptographic keys, cryptographic key data material, intermediate cryptographic calculation results and passwords, in the allocated storage area. The authorized accessing application can thus be seen as the administrator of the allocated storage area, having the capability to deallocate the storage area if necessary.

With reference made to FIG. 3, a first storage area can be allocated by a first application by performing the steps in the figure. Subsequently, a second storage area can be allocated for a second application, the applications having different identities. Thus, different parties can allocate their respective storage area in the secure environment 204, 211 without having to contact the secure environment administrator. Note that the skilled man realizes that hardware comprised in the present invention typically executes appropriate software to perform any of the steps described in connection to FIG. 3.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

What is claimed is:

1. A method comprising:
   allocating a storage area configured to store data for an application of a multiple of applications within a secure environment of a device to which access is restricted;
   associating the storage area with an application identity of said application of said multiple applications to generate an associated identity, wherein said application identity of said application of said multiple of applications is generated by the device;
   storing the associated identity within the secure environment; and
   controlling access to the storage area by verifying correspondence between the associated identity and an accessing application identity so that only said application of said multiple applications can access the storage area;
   wherein the application identity of said application is a digital signature created based on a private key, the digital signature being attached to said application, and the verification of the application identity is performed by verifying the digital signature with a public key that corresponds to said private key.

2. The method according to claim 1, wherein the allocating of a storage area, associating the storage area with the application identity, storing the associated identity and controlling the access to the storage area are performed for an application of a first party and, subsequently, the same actions are performed for an application of a second party independent of the first party.

3. The method according to claim 1, wherein the device stores a digital certificate issued by a trusted certification authority.

4. The method according to claim 1, wherein the secure environment comprises a smart card.

5. The method according to claim 1, wherein the allocating a storage area, associating the storage area with the application identity, storing the associated identity and controlling the access to the storage area are performed for an application of a first party and, subsequently, the same actions are performed for an application of a second party independent of the first party.

6. An apparatus comprising a control processing unit configured to:
- allocate a storage area configured to store data for an application of a multiple of applications within a secure environment of a device to which access is restricted;
- associate the storage area with an application identity of said application of said multiple applications to generate an associated identity, wherein said application identity of said application of said multiple of applications is generated by the device;
- store the associated identity within the secure environment; and
- control access to the storage area by verifying correspondence between the associated identity and an accessing application identity so that only said application of said multiple applications can access the storage area;
- wherein the application identity of said application is a digital signature created based on a private key, the digital signature being attached to said application, and the verification of the application identity is performed by decrypting the digital signature with a public key that corresponds to said private key.

7. The apparatus according to claim 6, wherein the device is configured to store a digital certificate issued by a certification authority.

8. The apparatus according to claim 6, wherein the secure environment comprises a smart card.

9. Circuitry for providing data security comprising:
- at least one storage circuit comprising at least one storage area configured to store data for an application of a multiple of applications within a secure environment of a device to which access is restricted;
- at least one processor configured to:
- associate the at least one storage area with an application identity of said application of said multiple applications to generate an associated identity, wherein said application identity of said application of said multiple of applications is generated by the device; and
- store the associated identity within the secure environment; and
- a register configured to enable said at least one processor to control access to said at least one storage area by verifying correspondence between the associated identity and an accessing application identity so that only said application of said multiple applications can access the at least one storage area;
- wherein the application identity of said application is a digital signature created based on a private key, the digital signature being attached to said application, and the verification of the application identity is performed by decrypting the digital signature with a public key that corresponds to said private key.

10. A mobile telecommunication terminal comprising circuitry for providing data security according to claim 9.

11. A computer-readable non-transitory storage medium storing computer-executable components, which when executed by a processor, performs:
- allocating a storage area configured to store data for an application of a multiple of applications within a secure environment of a device to which access is restricted;
- associating the storage area with an application identity of said application of said multiple applications to generate an associated identity, wherein said application identity of said application of said multiple of applications is generated by the device;
- storing the associated identity within the secure environment; and
- controlling access to the storage area by verifying correspondence between the associated identity and an accessing application identity so that only said application of said multiple applications can access the storage area;
- wherein the application identity of said application is a digital signature created based on a private key, the digital signature being attached to said application, and the verification of the application identity is performed by verifying the digital signature with a public key that corresponds to said private key.

12. An apparatus comprising:
- a processor configured for allocating a storage area configured to store data for an application of a multiple of applications within a secure environment of a device to which access is restricted;
- the processor further configured for associating the storage area with an application identity of said application of said multiple applications to generate an associated identity, wherein said application identity of said application of said multiple of applications is generated by the device;
- the storage area configured for storing the associated identity within the secure environment; and
- the processor further configured for controlling access to the storage area by verifying correspondence between the associated identity and an accessing application identity so that only said application of said multiple applications can access the storage area;
- wherein the application identity of said application is a digital signature created based on a private key, the digital signature being attached to said application, and the verification of the application identity is performed by verifying the digital signature with a public key that corresponds to said private key.

* * * * *